(12) United States Patent
Unter

(10) Patent No.: US 6,854,841 B1
(45) Date of Patent: Feb. 15, 2005

(54) POINT-OF-INCIDENCE INK-CURING MECHANISMS FOR RADIAL PRINTING

(75) Inventor: Jan E. Unter, Granite Bay, CA (US)

(73) Assignee: Elesys, Inc., Sunnyvale, CA (US)

( * ) Notice: Subject to any disclaimer, the term of this patent is extended or adjusted under 35 U.S.C. 154(b) by 0 days.

(21) Appl. No.: 10/125,777

(22) Filed: Apr. 17, 2002

Related U.S. Application Data (63) Continuation-in-part of application No. 09/062,300, filed on Apr. 17, 1998, now Pat. No. 6,264,295.
(60) Provisional application No. 60/284,605, filed on Apr. 17, 2001.

(51) Int. Cl.⁷ .............................................. B41J 2/01
(52) U.S. Cl. ...................... 347/102; 347/101; 347/104
(58) Field of Search ............................... 347/102, 101, 347/104, 106; B41J 2/01

(56) References Cited

U.S. PATENT DOCUMENTS

| | | | |
|---|---|---|---|
| 4,110,594 A | | 8/1978 | May .......................... 291/121 |
| 4,556,966 A | | 12/1985 | Bricot et al. .................. 369/52 |
| 4,721,969 A | | 1/1988 | Asano ........................ 346/157 |
| 4,728,963 A | | 3/1988 | Rasmussen et al. .......... 346/25 |
| 4,739,415 A | | 4/1988 | Toyono et al. ............... 358/296 |
| 4,967,286 A | * | 10/1990 | Nomula et al. .............. 386/124 |
| 5,019,838 A | * | 5/1991 | McKinley et al. ........... 346/121 |
| 5,041,846 A | | 8/1991 | Vincent et al. ............... 346/25 |
| 5,130,726 A | * | 7/1992 | Fukushima et al. ......... 347/102 |
| 5,154,957 A | | 10/1992 | Yamada et al. ............... 428/64 |
| 5,165,340 A | | 11/1992 | Karlyn et al. ............... 101/126 |
| 5,317,337 A | | 5/1994 | Ewaldt ........................ 346/1.1 |
| 5,395,181 A | * | 3/1995 | Dezse et al. ................. 400/103 |
| 5,444,687 A | | 8/1995 | Okumura ..................... 369/50 |
| 5,468,076 A | | 11/1995 | Hirano et al. ................. 400/59 |
| 5,470,691 A | * | 11/1995 | Arai et al. ................ 430/273.1 |
| 5,477,248 A | * | 12/1995 | Sugimoto et al. ............. 347/43 |
| 5,518,325 A | * | 5/1996 | Kahle .......................... 400/70 |
| 5,549,740 A | * | 8/1996 | Takahashi et al. ......... 106/31.43 |
| 5,597,590 A | | 1/1997 | Tanimoto et al. ......... 425/174.4 |
| 5,634,730 A | | 6/1997 | Bobry .......................... 400/88 |
| 5,656,229 A | | 8/1997 | Tanimoto et al. ........... 264/400 |
| 5,667,850 A | | 9/1997 | Gaven et al. ................ 427/510 |
| 5,730,048 A | * | 3/1998 | Averill et al. .................. 101/37 |
| 5,781,221 A | * | 7/1998 | Wen et al. ................... 347/232 |
| 5,846,632 A | * | 12/1998 | Chen et al. .................. 428/195 |
| 5,915,858 A | * | 6/1999 | Wen ............................. 400/61 |
| 5,967,676 A | | 10/1999 | Cutler et al. .................. 400/70 |
| 5,978,000 A | * | 11/1999 | Levine ......................... 346/62 |
| 6,013,145 A | | 1/2000 | Amo et al. .................... 156/74 |

(List continued on next page.)

FOREIGN PATENT DOCUMENTS

| | | | | |
|---|---|---|---|---|
| GB | 2320912 A | * | 7/1998 | .......... B41F/17/00 |
| GB | 2338212 A | * | 12/1999 | ............. B41J/2/01 |
| JP | 05319001 | | 11/1993 | .......... B41F/23/04 |
| JP | 07101039 | | 4/1995 | .......... B41F/17/14 |
| JP | 07144403 | * | 6/1995 | ............ B41J/23/04 |
| JP | 09265760 | * | 7/1997 | .......... G11B/23/38 |
| JP | 9-306144 | | 11/1997 | .......... G11B/23/40 |
| JP | 2003001811 A | * | 1/2003 | ............. B41J/2/01 |
| JP | 2004158099 A | * | 6/2004 | ............ G11B/7/24 |

Primary Examiner—Lamson Nguyen
Assistant Examiner—Leonard Liang
(74) Attorney, Agent, or Firm—Beyer, Weaver & Thomas LLP (57) ABSTRACT

Methods and apparatus for curing or drying of individual ink objects, dynamically during the radial printing process, at the ink object's point of incidence are described. Mechanisms for curing or drying ink objects, dynamically during the radial printing process, at the ink object's point of incidence, reducing ink object migration while the ink is wet, caused from inherent centrifugal forces and secondary air turbulence during the radial printing process, reducing image distortion, resulting in a more clearly printed image, such as on a spinning CD, are disclosed.

24 Claims, 5 Drawing Sheets

U.S. PATENT DOCUMENTS

| | | | |
|---|---|---|---|
| 6,019,151 A | 2/2000 | Wen et al. | 156/387 |
| 6,164,773 A * | 12/2000 | Oikawa | 347/100 |
| 6,207,118 B1 | 3/2001 | Gaven et al. | 422/186.3 |
| 6,264,295 B1 * | 7/2001 | Bradshaw et al. | 347/2 |
| 6,270,176 B1 | 8/2001 | Kahle | 347/2 |
| 6,350,071 B1 * | 2/2002 | Conwell et al. | 400/118.2 |
| 6,354,015 B1 * | 3/2002 | Ogasawara et al. | 34/60 |
| 6,485,138 B1 * | 11/2002 | Kubota et al. | 347/96 |
| 2002/0145636 A1 * | 10/2002 | Jones et al. | 347/2 |

* cited by examiner

POINT-OF-INCIDENCE INK-CURING MECHANISMS FOR RADIAL PRINTING

CROSS REFERENCE TO RELATED APPLICATIONS

This application claims the benefit of U.S. Provisional Application No. 60/284,605, filed Apr. 17, 2001, and this application is a Continuation-in-part of U.S. Non-provisional application Ser. No. 09/062,300, filed on Apr. 17, 1998, now U.S. Pat. No. 6,264,295. These referenced applications are incorporated herein by reference in their entirety for all purposes.

FIELD OF THE INVENTION

The present invention relates to fluid dispensing devices and mechanisms for curing or drying fluid dispensed from such devices. More particularly, it concerns dynamically curing or drying individual ink objects, at the point of incidence on the media, to avoid their displacement during the process of radial printing, wherein the media is spinning, such as with a CD disc.

BACKGROUND OF THE INVENTION

In the art of dispensing fluidic ink objects as it applies to printing, there is a need for curing or drying the fluid ink object after it impinges onto the receiving media. Furthermore, when the receiving media is also spinning, the fluid ink object must be cured or dried within a short time period, such that it does not migrate, elongate or distort from its originally intended shape, due to the inherent and ancillary effects of the spinning media.

As referenced and incorporated herein, U.S. Pat. No. 6,264,295, by Bradshaw et al, issued Jul. 24, 2001, teaches mechanisms for reducing or eliminating distortion related to radial printing. "Radial printing," defined therein, is the process of printing ink objects to spinning circular media, such as a CD. During radial printing, ink objects impinge upon the spinning media surface at the ink object's point of incidence.

In general, prior art traditionally addresses the issue of ink curing at a macroscopic, gross level, rather than at a microscopic, point-of-incidence level. Conventional mechanisms for ink curing, drying, and migration typically result in image distortion. Traditionally, inks are cured with techniques such as using heaters, irradiators, evaporators, air circulators or by ambient drying of the media, in which the media is undisturbed over a period of time. For example, aqueous inks are generally more suitable to drying at room temperature, since the evaporant, water vapor is typically neither toxic nor corrosive to the surrounding environment. Typically, an extra drying area, i.e., separation of the media from the printing location and time, is used in ink jet printers to allow for this process. Other inks, such as polymers, require irradiation by intense doses of ultra violet (UV) light, often creating unwelcomed excessive heat from the irradiance lamps. With traditional silk screening used to apply UV curable polymer inks, larger volumes of inks are used versus radial printing, thus creating higher concentrations of unwelcomed toxic outgases, necessitating this be done in industrial settings usually with exhaust fans to remove and treat the gases.

Other techniques include using drying fans to move air over a freshly inked surface; however, if air blasts are too intense, this method can also migrate the ink objects, causing distortion. Heaters usually irradiate a large portion or the entire area of the media surface with infrared (IR) energy, also often creating unwelcomed excessive heat from the IR source device. Since most radial printing is done in devices intended for offices or homes, reducing the unwelcomed side effects of these traditionally ink curing or drying becomes a more challenging design task when developing an integrated CD recording, radial printing device.

The process of implementing radial printing devices reveals new specific issues and problems when considering components used to traditionally cure or dry ink, such as:

(1) Too much heat is built up within the device, generated by the curing or drying element, due to the confined space of the relatively small packaging area within or in near proximity to a CD or DVD recording device;

(2) Air turbulence and eddy currents caused from the media spinning, especially induced by the near proximity of the print head hovering directly over the media surface; and (3) Centrifugal force, resulting from the media spinning between 360 RPM at 1× CD spinning rates, to over 14,400 RPM and higher with increasing spinning rates of 40× or more.

It would be desirable to reduce these effects:

(1) Unwelcomed excess residual heat from curing or drying device components;

(2) Ink object distortion caused by turbulence and eddy currents; and (3) Ink object migration from their original point of incidence, caused by centrifugal force.

In view of the foregoing, there is a need for improved curing mechanisms used during radial printing. Additionally, there is a need for curing mechanisms to solve the unique problems associated with curing a rotating media, such as a CD, housed within the recording device and during printing radially.

SUMMARY OF THE INVENTION

Accordingly, the present invention provides mechanisms that significantly reduce the impact of heat and size limitations by using point-of-incidence, ink-curing techniques. For example, a small-size, directed-energy-source, such as a solid-state laser, is focused on the ink as the print head dispenses ink onto the media. Since radial printing prints onto spinning media, there is ample time to repeatedly print to the same target spot on the media while the print head hovers overhead. Similarly, a directed energy source or laser can repeatedly focus energy at the same target spot of ink point-of-incidence with each passing rotation of the media (e.g. CD), to effect drying or curing. In a CD-recording application, since CD recording devices typically take longer to record than printing time, drying or curing the ink can usually be finished during the ensuing recording time through multiple passes over the ink point-of-incidence areas.

Since the print head within a radial printing application dispenses a miniscule amount of ink volume at the point of incidence, as compared with silkscreen inks spread simultaneously over the entire media surface, the energy used to cure the ink can be much less that that of traditionally applied inks over larger surface areas, thus also minimizing the area and length of time the media is exposed to higher temperatures.

Since the curing mechanisms focus radiation to cure or dry the ink directly on or closely nearby the point of incidence ink, the physical size of the drying apparatus can be significantly reduced, as compared with larger area conventional curing mechanisms (e.g., silkscreen curing with a high-powered, large area UV-radiation lamp), and build up of excessive heat from the irradiating or drying apparatus can thus generate much less excess heat to the surrounding device components and housing. For example, a small, solid-state laser, fashioned from light-emitting-diode technology may be used as the curing mechanism. In one embodiment, a small size, directed-energy-source, such as a solid-state laser, is used to focus on the ink as it is applied at the point of incidence, allowing for a more compactly designed radial printing device. Similarly due to it smaller size, less noise results by not needing higher volume displacement fans to cool the radial printing device interior.

In embodiments of the printing system disclosed herein ink object migration is substantially reduced or eliminated. This reduction also reduces image distortion, resulting in a more clearly and precisely printed image on the media, such as on a CD. For example, one embodiment in this invention includes a point-directed energy source, such as a tuned-spectrum, solid-state laser beam, to cure ink objects as they impact on the media substrate surface, or immediately thereafter. Another embodiment includes print dispensing mechanisms (e.g., dual nozzle print pens or dual print pens) for simultaneously dispensing chemically reactive uncured ink objects with a chemically reactive agent. Thus, the ink and chemically reactive agent will dynamically mix upon impact and the ink will be cured shortly thereafter. Other point-of-incidence curing mechanisms are similarly envisioned, but should not be limited solely to the methods disclosed herein.

In one embodiment, a printing system for radially printing onto a rotating media is disclosed. The printing system includes a dispensement mechanism for dispensing an ink object onto a media while the media is rotating under the dispensement mechanism and a curing mechanism for drying or curing the dispensed ink object at a point-of-incidence of the ink object while the media is rotating under the dispensement mechanism. The printing system further includes a controller for causing the dispensement to dispense the ink object and the curing mechanism to dry or cure the dispensed ink at the point-of-incidence.

In a specific implementation, the curing mechanism comprises a laser device or laser diode. In one aspect, the laser device or laser diode has an energy selected to dry or cure the ink object substantially instantaneously when the ink object hits the point-of-incidence. In another aspect, the curing mechanism further comprising a lens for focusing energy from the laser device or laser diode at the point-of-incidence. In another implementation, the curing mechanism further comprising a light pipe or channel for directing the energy from the laser device or laser diode at the point-of-incidence. In yet another implementation, the curing mechanism comprises a radiant energy source having an infrared wavelength selected to dry or cure the ink object substantially instantaneously at the point-of-incidence. For example, the curing mechanism comprises an incandescent or halogen light source.

In a specific embodiment, the controller includes an encoder for determining a position of the media, a rotation motor for rotating the media, a synchronization system for receiving the position of the media from the encoder and sending control signals to the rotation motor to thereby control the rotation motor based on the position of the rotating media, and an imaging system for receiving an image source and the control signals from the synchronization system to thereby determine ink dispensement signals. The controller further includes a pen control system for receiving the ink dispensement signals from the imaging system to thereby control ink dispensement by the dispensement mechanism and for synchronizing the curing mechanism to cure or dry the ink object at the point-of-incidence.

In a further aspect, the ink object is a substantially singular drop of ink. In another aspect, the ink dispensement mechanisms is arranged to dispense the ink object onto an area that includes a radius of the rotating media.

In yet another embodiment, a printing system for radially printing onto a rotating media is disclosed. The printing system includes a dispensement mechanism having a first nozzle for dispensing an ink object onto a media while the media is rotating under the dispensement mechanism and a second nozzle for dispensing a chemically reactive curing object that mixes and chemically reacts with the ink object to thereby dry or cure the dispensed ink object at a point-of-incidence of the ink object while the media is rotating under the dispensement mechanism, wherein the ink object is uncured and chemically reactive to the curing object. The printing system also includes a controller for causing the dispensement mechanism to dispense the ink object and the curing object at the point-of-incidence of the ink object.

In one aspect, the dispensement mechanism comprises a first pen having the first nozzle and a second pen having the second nozzle. In another aspect, the dispensement mechanism comprises a single printing pen having the first nozzle and the second nozzle. In yet another aspect, the dispensement mechanism is arranged to dispense the ink object substantially simultaneously with the chemically reactive curing object.

In another embodiment, the invention pertains to a method for radially printing onto a rotating media. A media is rotated and an ink object is dispensed onto the media while the media is rotating. The dispensed ink object is dried or cured at a point-of-incidence of the ink object while the media is rotating.

In a specific method aspect, the drying or curing of the ink object is performed substantially instantaneously when the ink object hits the point-of-incidence. In another aspect, the ink object is a substantially singular drop of ink. In another aspect, the ink object is dispensed onto an area that includes a radius of the rotating media.

In an alternative method embodiment, a media is rotated and an ink object is dispensed onto the media while the media is rotating. A chemically reactive curing object is also dispensed onto the media while the media is rotating such that it mixes and chemically reacts with the ink object to thereby dry or cure the dispensed ink object at a point-of-incidence of the ink object, wherein the ink object is uncured and chemically reactive to the curing object. In one specific implementation, the ink object is dispensed substantially simultaneously with the chemically reactive curing object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF SPECIFIC EMBODIMENTS

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

For the scope of this invention, the terms "CD" and "media are intended to mean all varieties of optical recording media discs, such as CD-R, CD-RW, DVD-R, DVD+R, DVD-RAM, DVD-RW, DVD+RW and the like.

The ink curing mechanisms described herein may be integrated within any suitable radial printer. Several embodiments of radial printers are further described in above reference U.S. Pat. No. 6,264,295, entitled RADIAL PRINTING SYSTEM AND METHODS, by George L. Bradshaw et al, issued Jul. 24, 2001 and U.S. patent application, having application Ser. No. 09/872,345, entitled LOW PROFILE CAM-ACTUATED TRACKING INK HEAD CARTRIDGE WITH INTEGRATED SERVICE-STATION, by Randy Q. Jones et al., filed Jun. 1, 2001, which patent and patent application are herein incorporated by reference in their entirety.

In a preferred embodiment, a curing mechanism is provided to cure an ink object at the ink point-of-incidence, while the ink object is still mostly singular and of a smaller volume and mass, thus reducing its tendency to migrate radially or annularly. In alternative embodiments, the curing mechanism is arranged to cure or dry an ink spot or ink area that corresponds to the print head footprint. The relatively small curing area in-turn reduces image distortion, such as with ink objects migrating into and combining with adjacent ink objects to form larger, more-difficult-to-cure ink areas. These curing mechanisms also avoid the problem of the ink mixing unintentionally with adjacent but differently colored ink objects and thus changing the color hue, tint or shade. Additionally, these curing mechanisms avoid displacing the ink entirely from the intended original point of incidence and thus distorting the originally intended shape of the ink object or the image shape in its entirety.

Printing on rotating circular media at a given radius at a given angular position using ink fired from inkjet pens has inherent fluid dynamic limitations as rotating speeds increase. At a certain rotational speed, ink objects, or dots, may migrate radially outward before they are entirely cured or dried. This may produce blurred or smeared ink distortions primarily in the radial and collaterally in the azimuthal directions. Natural air-drying methods or a wide-area, general-purpose ink curing bar may take too long or too many rotations, to sufficiently dry the ink droplets in time to prevent ink droplet migration. For example, aqueous inks typically require about 10 to 20 seconds per surface of media to ambiently dry solid area images. Adding extra power to the curing bar may expose the circular media to undesirable levels of excess heat. By localizing the drying energy on minute ink point-of-incidence droplets or areas, the energy is efficiently used and excess heat is minimized. In general terms, the present invention provides mechanisms for controlling dot migration at the point of incidence through drying or curing the ink dots as they impinge at the media substrate surface.

Figure 1:
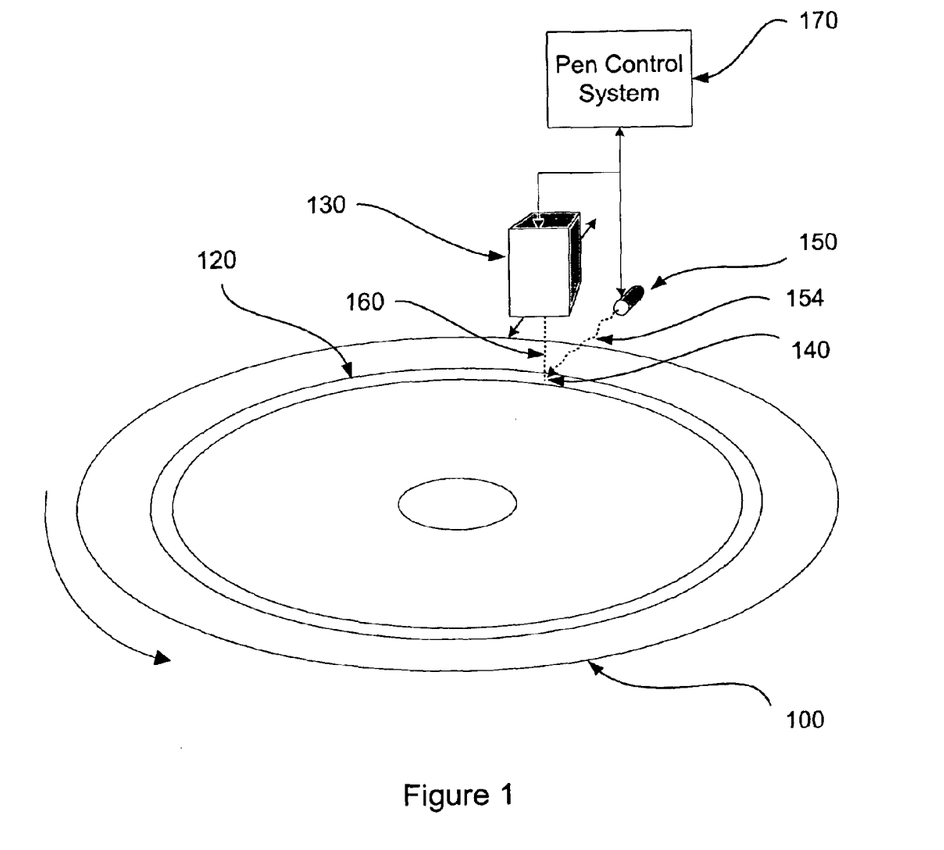
FIG. 1 represents a portion of a radial printing system with media, inkjet pen and focused energy-curing system in accordance with various embodiments of the present invention.

In one embodiment in FIG. 1, a laser device or laser-diode 150 is used to dry ink droplets 160 as they impinge on the surface at the point of incidence 140 creating a band of ink 120 on a spinning circular rotating media 100. This laser device 150 is a type with sufficient energy 154 to dry the ink droplet object 160 almost instantaneously at the point of droplet impact or point of incidence 140 with the substrate 100. The energy 154 may be determined, for example, experimentally.

Figure 4:
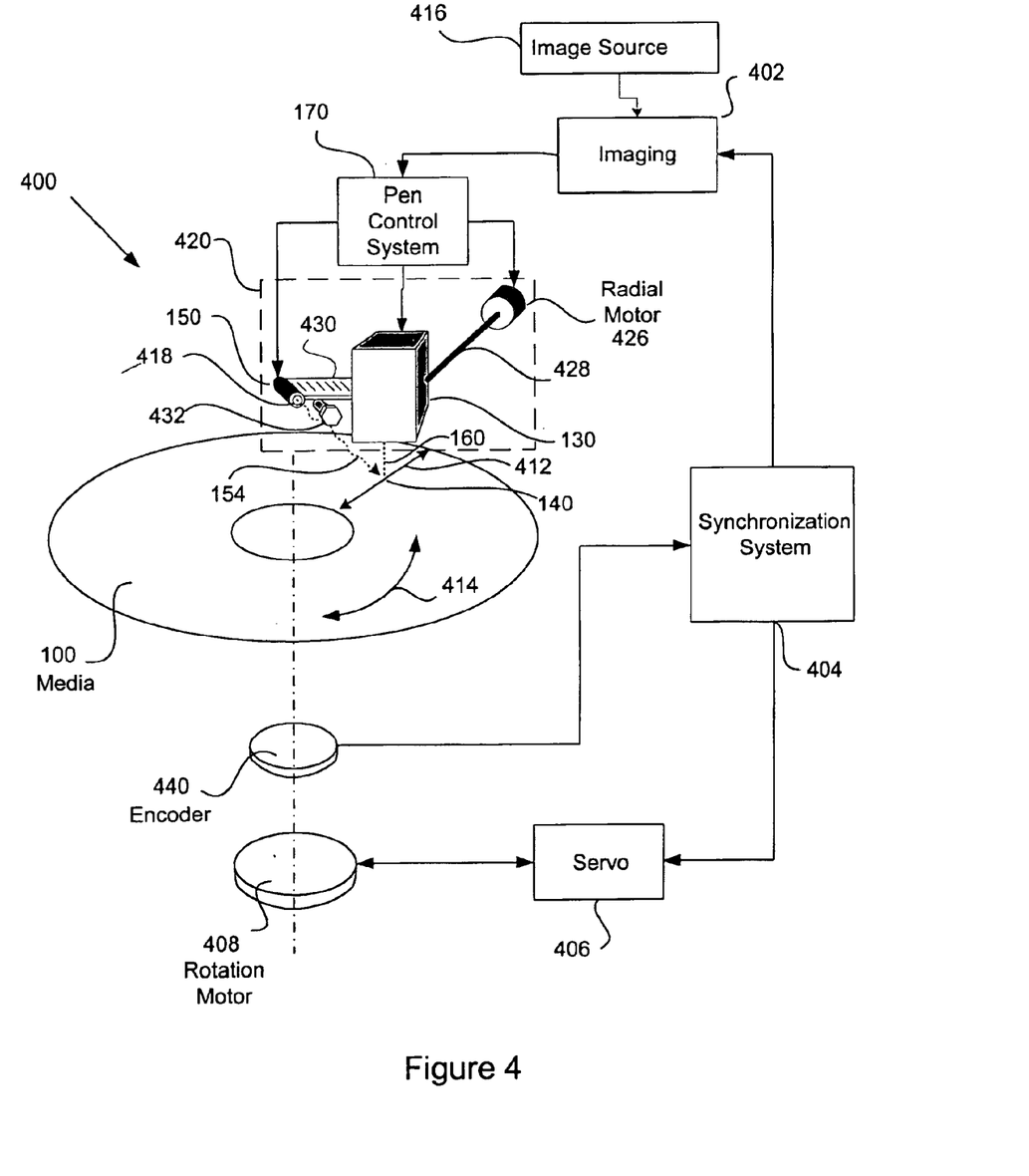
FIG. 4 is a detailed diagrammatic representation of a portion of a radial printing system in accordance with a specific embodiment of the present invention.

FIG. 4 is a detailed diagrammatic representation of a portion of a radial printing system 400 in accordance with a specific embodiment of the present invention. The elements shown in FIG. 1 are used as part of a radial printing system 400. To control the laser firing time, pen control system 170 works with input from the synchronization system 404 and imaging system 402 to properly control timing and placement of ink objects and laser-diode 150 emission at the point of incidence 140. In this embodiment, the laser-diode 150 is held rigid, mounted jointly, and moves in tandem with the pen 130 in the head assembly 420. The laser-diode is actuated by radial motor 426 and actuator 428 along the radial path 412.

Several embodiments of the synchronization system 404, imaging system 402, server 406, as well as other components of the printer system, are described further in the above referenced U.S. Pat. No. 6,264,295. In general terms, the rotation motor 408 represents a mechanism for rotating the media 100 along a circular direction 414. The rotation motor 408 is in the form of any suitable motor for rotating a platter. For example, the rotation motor 408 may be in the form of a stand alone stepper and/or encoder motor and/or a brushless DC and/or Tach loop and/or angle encoder. Alternatively, the rotation motor 408 may be implemented by an existing OEM platter rotation motor that may serve other non-printing related functions. For example, the present invention may be configured to utilize a rotation motor from an existing CD-R writer device or CD player. In one particularly advantageous embodiment, the present invention may even be integrated into an OEM device, such as a CD-R writer device to take advantage of the existing motor therein.

The servo system 406 represents a mechanism for controlling, among other things, the rotation of the rotation motor 408. To facilitate control of the rotation motor 408, the servo system 406 may receive rotation data from the rotation motor 408 that tracks a rotation position of the rotation motor 408 and/or media 100. The rotation data may be in the form of encoder data from encoder 440. Based on the position data, the servo system 406 outputs control data to the rotation motor 408. For example, the position of the rotation motor 408 may be detected and sent as encoder data to the servo system 406. The servo system 406 then adjusts the rotation position of the rotation motor 408 based on the encoder data. Thus, the servo system 406 may be employed to control the rotational speed of the rotation motor 408. The servo system 406 may also control movement of the head assembly 130, as well as rotation of the rotation motor 408. Specifically, the servo system 406 may be configured to move the head assembly 130 to a particular position along a radial axis 412.

Alternatively the servo system 406 represents a mechanism as part of an OEM CD-R drive for controlling, among other things, the rotation of the rotation motor 408. To facilitate control of the rotation motor 408, the servo system 406 may receive commands from the host computer 512 (FIG. 5) to explicitly rotate the CD rotation motor 408 and/or media 100 at a prescribed rotation speed. The rotation data may be in the form of encoder data from encoder 440. For example, the position of the rotation motor 408 may be detected and sent as encoder data to the synchronization system 404. The synchronization system 404 then sends the rotation position information to the imaging system 402, to predict when to fire the pen 130. Thus, the servo system 404 may be employed to control the rotational speed of the rotation motor 408. The pen control system 170 may control movement of the head assembly 130, and the host computer 512 may control rotation of the rotation motor 408. Specifically, the pen control system 170 may be configured to move the head assembly 130 to a particular position along a radial axis 412.

The imaging system 402 represents a mechanism for controlling when the head assembly 130 initiates and terminates printing a particular dot, swath, strip, or pattern that forms part of the image to be reproduced onto the media 100 as the head assembly traverses different areas of the media. The imaging system signals when to dispense the ink, for example, onto the media 100 such that a particular dot is printed onto the media 100 at a particular position. The imaging system 402 receives, analyzes, and transforms an image source 416 to determine how to control the head assembly 130. To facilitate printing onto the rotating media 100, the imaging system 402 may be configured, among other things, to convert a rectangular based bitmap into a polar based bitmap.

Figure 5:
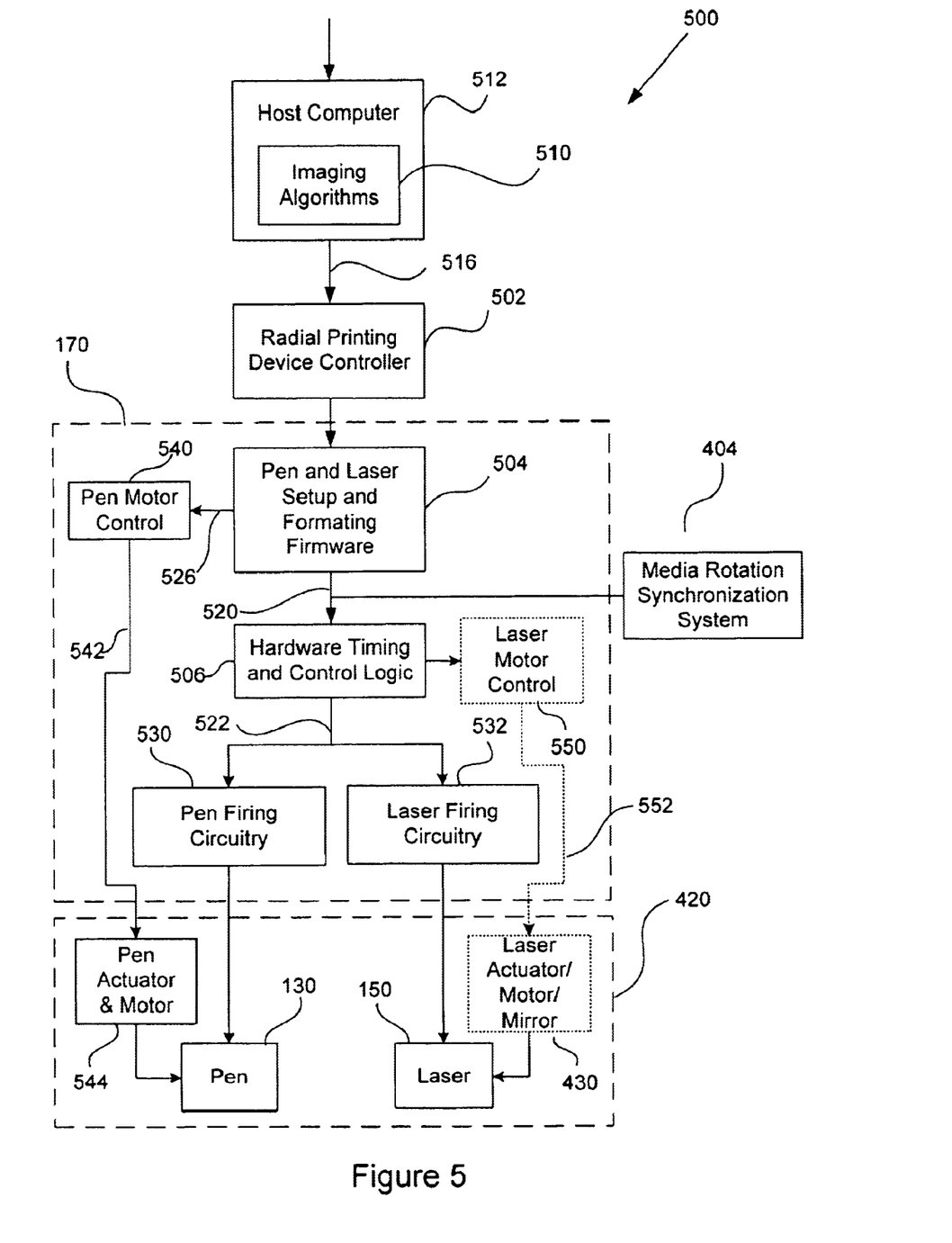
FIG. 5 is a block diagram showing the logic for controlling a point-of-incidence radial printing system in accordance with a specific embodiment of the present invention.

FIG. 5 shows a block diagram 500 of a mechanism for precisely controlling laser firing in full synchronization with the pen firing in accordance with one embodiment of the present invention. In the illustrated embodiment, precise control of the pen is obtained though a combination of analog and digital hardware logic circuits, firmware and host-based software, forming a pen control system 170. To synchronize the laser 150 firing, first the firing time is predicted by the host computer 512 image rendering algorithms 510. Next, a command stream 516 is sent to the radial printing device controller 502, which in turn passes the instructions to the pen and laser setup and formatting firmware 504. This firmware 504 formats a hardware command stream 520 for the hardware timing and control logic 506, commands 526 the pen motor control 540 to in turn command 542 the pen actuator and motor 544 to move the head assembly 420 to the target print point of incidence 140 track 120 (FIG. 1). Thereafter, the firmware 504 sets up the hardware timing and control logic 506 registers and commands 522 both the pen 130 and laser 150 to synchronously fire in concert with the media rotation synchronization system 404 inputs, to assure the correct instantaneous angular position for the point of incidence 140. These control signal commands 522 are issued synchronously to both the pen firing circuitry 530 and to the laser firing circuitry 532, whereupon the pen 130 then fires the ink droplets in the correct trajectory 160 to impinge at the point of incidence 140, while at the precise synchronous time the laser 150 fires to dry or cure the ink object as it impinges on the surface 100 at the point of incidence 140.

The laser-diode 150 may be one of a type manufactured from JDS Uniphase, (Spectra Diode Labs), of San Jose, Calif., such as part number SDL-6370 or 6380, which emit 2–4 watts of infrared (IR) spectrum energy at 920 or 980 nm. Typical ink droplet size in modern ink jet pens is 2–3 pL in volume. When focused with a lens 418 (FIG. 4) on the point of incidence 140, this device creates sufficient energy to effect drying. Alternately, the laser-diode 150 can be directed to the source through a light pipe or fiber optic channel to direct the energy 154 along a prescribed path to the point of incidence 140.

Similarly in a second embodiment, also represented in FIG. 1, a laser device or laser-diode 150 can be used to dry ink 160 as it impinges on the surface at the point of incidence 140 of spinning circular rotating media 100. This laser device is of a specific UV wavelength and of sufficient energy 154 to cure a polymer-based ink droplet object 160 almost instantaneously at the point of droplet impact 140 with the substrate 100. The energy 154 may be determined, for example, experimentally. Many UV laser-diode 150 devices of this type are still experimental and under development. However, higher power products are just coming to market, such as a product, NSCx 180F, from Nichia of Tokushima, Japan, which includes InGaN chips emitting nearly 100 mW of 380 nm UV light at 500 mA. While not yet as powerful as the IR lasers described in the first embodiment, it is predicted that these and other new developments will be available in the near future, as related to technology advances for blue laser used for DVD recordable devices. Radial printing allows a repeated opportunity to expose the point of incidence 140 with adequate power to cure polymer-based inks using point-of-incidence ink curing mechanisms. With the exception of the type of energy source, other implementation details are described above with reference to FIGS. 1, 4 and 5.

In a third embodiment, also represented in FIG. 1, a focused-beam radiant energy source 150 is used to dry ink 160 as it impinges at the point of incidence 140 on the surface of spinning circular rotating media 100. This radiant energy source 150 is of a specific infrared wavelength and of sufficient energy 154 to cure an aqueous-based ink droplet object 160 almost instantaneously at the point of droplet impact 140 with the substrate 100. An example of a radiant energy source 150 of this type may be from a small incandescent or halogen lamp. Alternatively, the laser-diode 150 represented as an incandescent or halogen lamp, in the embodiment, can to directed to the source through a light pipe or fiber optic channel to direct the energy 154 along a prescribed path to the point of incidence 140, such as that implemented by Welch Allyn of Skaneateles Falls, N.Y., in their product, an LE60 fiber optic illuminator assembly, to direct, focus or collimate energy 154 at the point of incidence 140. If this unit is found to be too large or generate too much heat, it could be mounted external to the radial printing device and the energy 154 piped in to the point of incidence 140. Another example might be a small heating coil, shrouded with reflective materials to direct the energy to the point of incidence 140. The energy 154 may be determined, for example, experimentally. With the exception of the type of radiant energy source 150, other implementation details of this third embodiment are described above with reference to FIGS. 1, 4 and 5.

Figure 2:
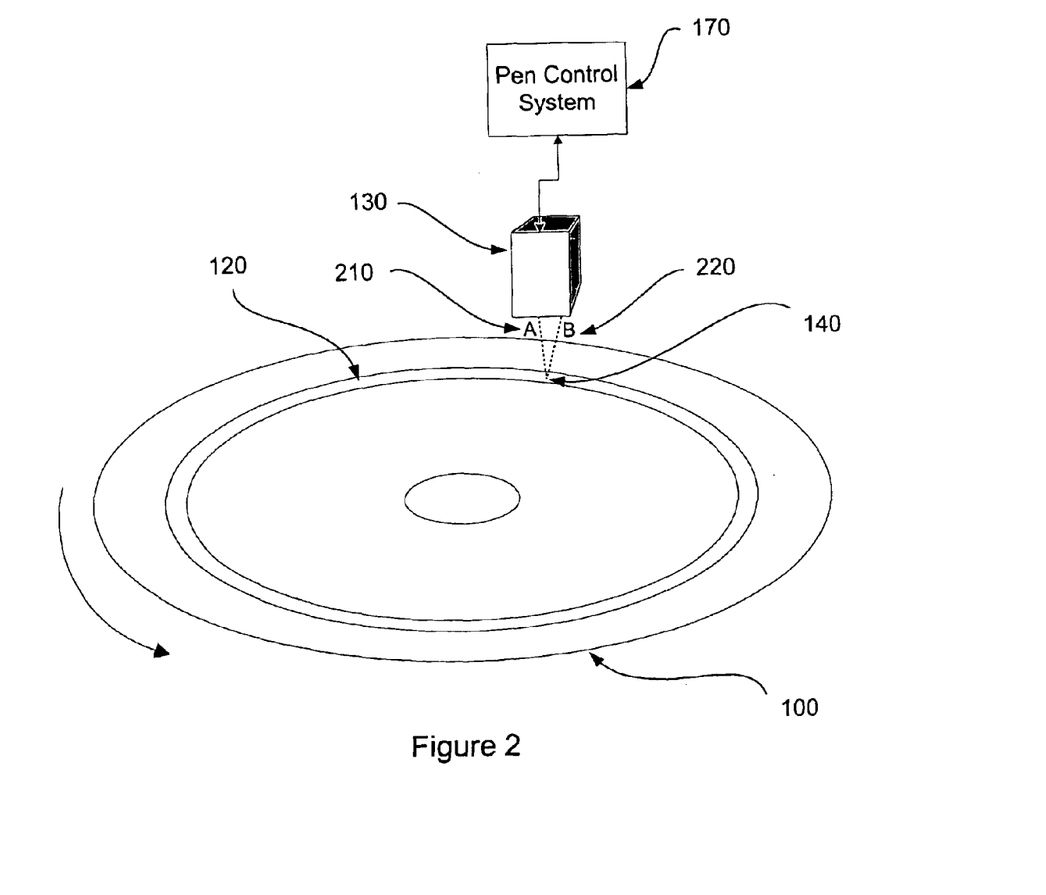
FIG. 2 represents a portion of a radial printing system with media, inkjet pen with a dual-nozzle for dispensing ink and curing agent in accordance with various alternative embodiments of the present invention.
Figure 3:
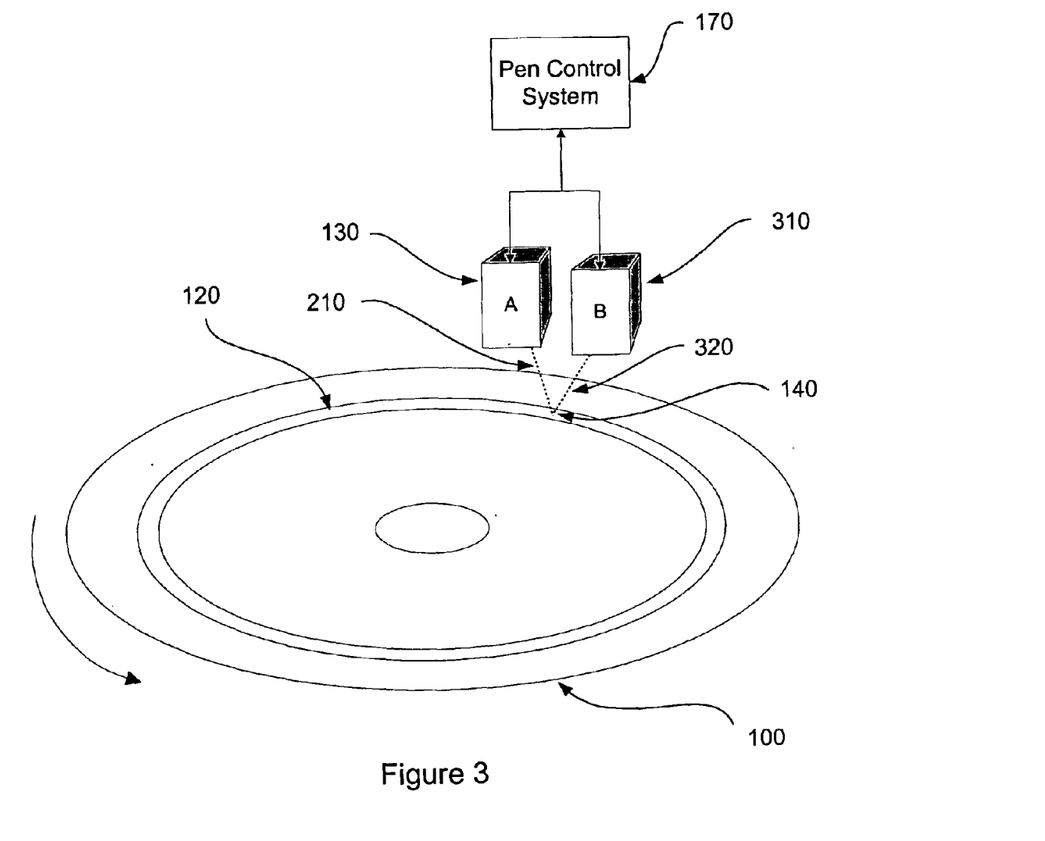
FIG. 3 represents a portion of a radial printing system with media and two inkjet pens for dispensing ink and curing agent in accordance with other alternative embodiments of the present invention.

In a fourth embodiment, illustrated in both FIG. 2 and FIG. 3, dual-nozzles 210 and 220 of a single inkjet printing pen 130 or two entirely separate pens 130 and 310 with respective separate nozzles 210 and 320, are fired synchronously to place two ink objects that simultaneously impinge on the surface at the point of incidence 140 of spinning circular rotating media 100. In the first pen nozzle 210, chemically reactive uncured ink is dispensed. In the second pen nozzle 220 or 310, a chemically reactive curing agent is dispensed. Precise timing by a pen control system 170 is used to fire both nozzles such that both ink objects are placed such that they simultaneously impinge on the substrate surface. The kinetic energy of the resulting collision mixes the two ink reagent objects and thereby initiates the on contact curing due to chemical reaction between the two reagent ink objects, hardening the ink. The reagent inks are selected experimentally, and may have specifically fast curing times such that ink migration is minimized.

In a fifth embodiment, similar to the fourth embodiment, but differs in that the ink and reagent do not impinge upon the surface simultaneously, but instead asynchronously, such that the ink is first placed on the surface 100 during one rotation of the media, and the curing agent is placed upon the surface 100 in a subsequent rotation of the media. Dual-nozzles 210 and 220 (FIG. 2) of an single inkjet printing pen or two entirely separate pens 130 and 310 with respective separate nozzles 210 and 320 (FIG. 3) are fired asynchronously to place two ink objects that impinge at a substantially identical position on the surface at the point of incidence 140 of spinning circular rotating media 100. In the first pen nozzle 210, chemically reactive uncured ink is dispensed. In the second pen nozzle 310, a chemically reactive curing agent is dispensed. Precise timing by a pen control system 170 is used to fire both nozzles such that both ink objects are placed such that they impinge at an identical point of incidence 140 on the surface of the substrate surface 100, either during the current or during a subsequent rotation. The kinetic energy of the resulting collision mixes the two ink objects and thereby initiates the curing on-contact chemical reaction between the two ink objects, hardening the ink. The reagent inks are selected experimentally, and may have specifically fast curing times such that ink migration is minimized.

In a sixth embodiment, also illustrated in FIG. 4, a single pen 130 with a nozzle width of the entire radius 412 of the CD is placed radially over the spinning circular rotating media 100. In this embodiment, the laser 150 sweeps the area under the radius-width printhead in one of two ways: (1) To actuate the head assembly 420 by means of a laser actuator 430, which moves the laser 150 and directs the energy 154 to sweep the radial line of print 412; or (2) with the laser 150 in a fixed mount, a mirror 432 is used to sweep the energy 154 emitted from the laser 150 across the radial line of print 412, a practice well known in the art of using lasers in printers. Referring to FIG. 5, which shows one technique for precisely controlling laser firing in full synchronization with the pen firing, all logic used may be the same logic as described in the first embodiment above with reference to FIGS. 1, 4, and 5, except for the addition of logic to control the laser motor 550, which in turn send control signals 552 to the laser actuator-motor/mirror control subsystem 430, which prepositions the laser 150 to the appropriate point of incidence 140 or along the radial line of print 412, prior to synchronously laser 150 firing with the pen 130 firing.

The above-described embodiments provide one or more of the following associated advantages:

1. Prevent or minimize ink dot migration at higher rotational speeds;
2. Reduce heating to the media surface by applying point energy instead of wider-area energy, such as a curing bar;
3. Reduce heating to the device housing these radial printer and recording device, by applying a much lower heat-generating point energy source instead of wider-area energy, such as a curing bar;
4. Chemical reactive inks, such as UV-curable or epoxy-based, reduce the need to seal inks to prevent air-drying as well as generally providing for easier inkjet pen service solutions;
5. Chemical reactive inks, such as UV-curable or epoxy-based, stick better to bare, circular media surfaces without the need for an ink absorption layer (IAL); and
6. Chemical reactive inks, such as UV-curable or epoxy-based, can be protective clear overcoats, to protect underlying colored inks.

Other embodiments, using similar mechanisms for ink object point-of-incidence curing or drying methods, are similarly contemplated. While this invention has been described in terms of several preferred embodiments, there are alterations, permutations, and equivalents, which fall within the scope of this invention. It is therefore intended that the following appended claims be interpreted as including all such alterations, permutations, and equivalents as fall within the true spirit and scope of the present invention.

What is claimed is:

1. A printing system for radially printing onto a rotating media, comprising:
    a dispensement mechanism for dispensing an ink object onto a media at a point-of-incidence while the media is rotating under the dispensement mechanism;
    a curing mechanism for drying or curing the dispensed ink object directly at the point-of-incidence of the ink object while the media is rotating under the dispensement mechanism; and
    a controller for synchronizing the dispensement mechanism to dispense the ink object at the point-of-incidence with the curing mechanism to dry or cure the dispensed ink directly at the point-of-incidence while the media is rotating, the point-of-incidence having an angular position on the rotating media.

2. A printing system as recited in claim 1, wherein the curing mechanism comprises a laser device or laser diode.

3. A printing system as recited in claim 2, wherein the laser device or laser diode has an energy selected to dry or cure the ink object substantially instantaneously when the ink object hits the point-of-incidence.

4. A printing system as recited in claim 3, the curing mechanism further comprising a lens for focusing energy from the laser device or laser diode at the point-of-incidence.

5. A printing system as recited in claim 3, the curing mechanism further comprising a light pipe or channel for directing the energy from the laser device or laser diode at the point-of-incidence.

6. A printing system as recited in claim 1, wherein the curing mechanism comprises a radiant energy source having an infrared wavelength selected to dry or cure the ink object substantially instantaneously at the point-of-incidence.

7. A printing system as recited in claim 6, wherein the curing mechanism comprises an incandescent or halogen light source.

8. A printing system as recited in claim 1, wherein the controller comprises:
    an encoder for determining a position of the media;
    a rotation motor for rotating the media;

a synchronization system for receiving the position of the media from the encoder and sending control signals to the rotation motor to thereby control the rotation motor based on the position of the rotating media;

an imaging system for receiving an image source and the control signals from the synchronization system to thereby determine ink dispensement signals; and a pen control system for receiving the ink dispensement signals from the imaging system to thereby control ink dispensement by the dispensement mechanism and for synchronizing the curing mechanism to cure or dry the ink object at the point-of-incidence.

9. A printing system as recited in claim 1, wherein the ink object is a substantially singular drop of ink.

10. A printing system as recited in claim 1, wherein the ink dispensement mechanism is arranged to dispense the ink object onto an area that includes a radius of the rotating media.

11. A printing system as recited in claim 1, wherein the curing mechanism comprises a UV laser-diode having an ultraviolet wavelength selected to dry or cure the ink object substantially instantaneously at the point-of-incidence.

12. A printing system as recited in claim 1, wherein the synchronizing comprises issuing commands to both the dispensement mechanism and the curing mechanism to timely dry or cure the ink object as it impinges on the media at the point of incidence.

13. A printing system as recited in claim 1, wherein the synchronizing comprises predicting when the dispensement mechanism dispenses the ink object onto the rotating media so that the curing mechanism can dry or cure the dispensed ink directly at the point-of-incidence while the media is rotating.

14. A printing system as recited in claim 1, wherein the synchronizing comprises timing the dispensement mechanism and the curing mechanism to account for centrifugal forces generated by the rotating media.

15. A printing system for radially printing onto a rotating media, comprising:

a dispensement mechanism having a first nozzle for dispensing an ink object onto a media at a point-of-incidence while the media is rotating under the dispensement mechanism and a second nozzle for dispensing a chemically reactive curing object that mixes and chemically reacts with the ink object at the point-of-incidence to thereby dry or cure the dispensed ink object directly at the point-of-incidence of the ink object while the media is rotating under the dispensement mechanism, wherein the ink object is uncured and chemically reactive to the curing object; and a controller for causing the dispensement mechanism to synchronously dispense the ink object and the curing object directly at the point-of-incidence of the ink object while the media is rotating, the point-of-incidence having an angular position on the rotating media.

16. A printing system as recited in claim 15, wherein the dispensement mechanism comprises a first pen having the first nozzle and a second pen having the second nozzle.

17. A printing system as recited in claim 15, wherein the dispensement mechanism comprises a single printing pen having the first nozzle and the second nozzle.

18. A printing system as recited in claim 15, wherein the dispensement mechanism is arranged to dispense the ink object substantially simultaneously with the chemically reactive curing object.

19. A method for radially printing onto a rotating media, comprising:

rotating a media; and synchronizing a dispensing of an ink object onto the media at a point-of-incidence with a drying or curing of the dispensed ink object directly at the point-of-incidence of the ink object while the media is rotating, wherein the point-of-incidence has an angular position on the rotating media.

20. A method as recited in claim 19, wherein the drying or curing of the ink object is performed substantially instantaneously when the ink object hits the point-of-incidence.

21. A method as recited in claim 19, wherein the ink object is a substantially singular drop of ink.

22. A method as recited in claim 19, wherein the ink object is dispensed onto an area that includes a radius of the rotating media.

23. A method for radially printing onto a rotating media, comprising:

rotating a media; and synchronizing a dispensing of an ink object onto the media at a point-of-incidence with a dispensing of a chemically reactive curing object onto the media at the point-of-incidence while the media is rotating such that it mixes and chemically reacts with the ink object to thereby dry or cure the dispensed ink object directly at the point-of-incidence of the ink object, wherein the ink object is uncured and chemically reactive to the curing object, and wherein the point-of-incidence has an angular position on the rotating media.

24. A method as recited in claim 23, wherein the ink object is dispensed substantially simultaneously with the chemically reactive curing object.

* * * * *